No. 852,412. PATENTED MAY 7, 1907.
O. BEITLER.
VEHICLE HUB.
APPLICATION FILED FEB. 8, 1906.
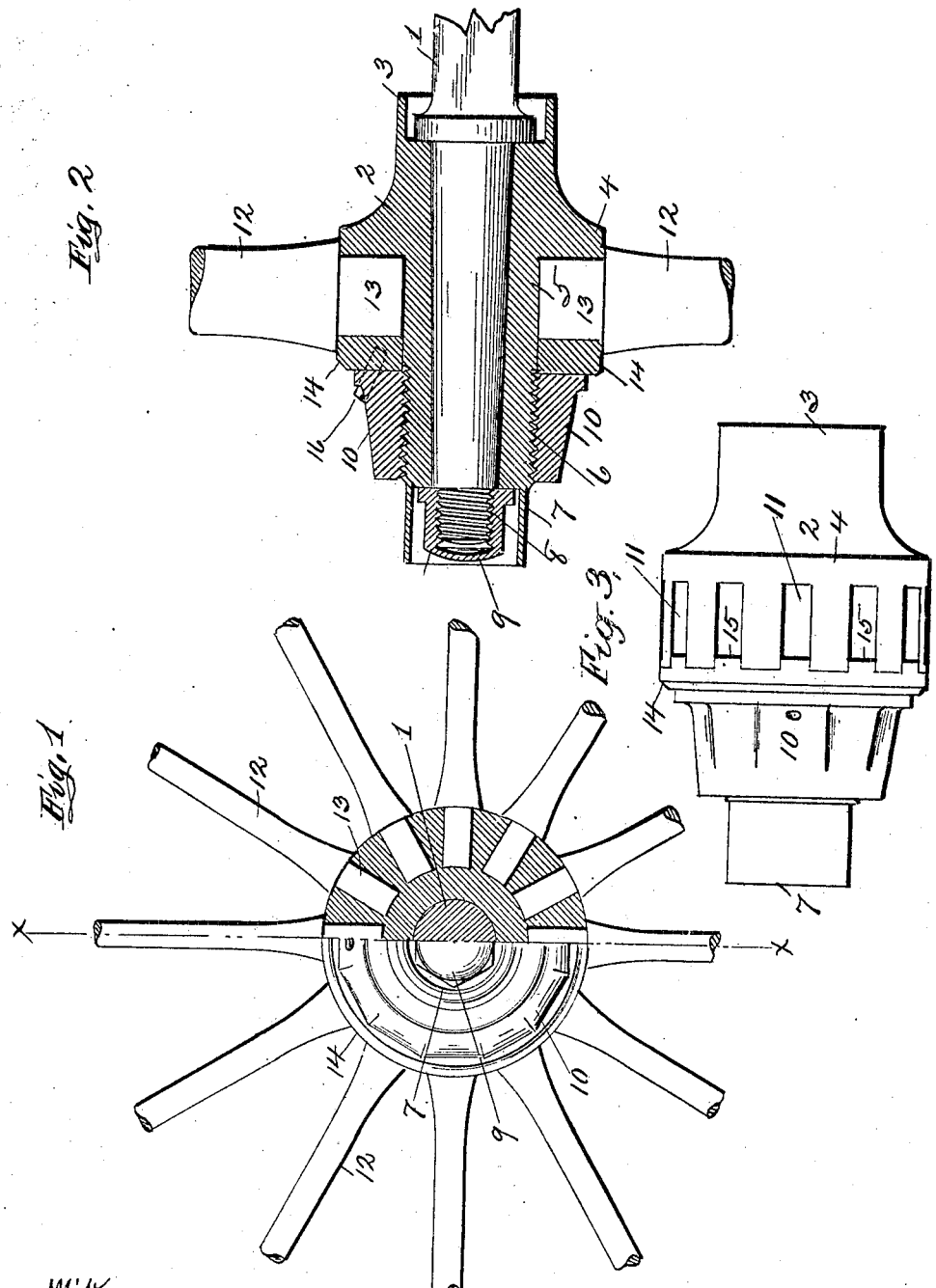

UNITED STATES PATENT OFFICE.

OTTO BEITLER, OF PITTSBURG, PENNSYLVANIA.

VEHICLE-HUB.

No. 852,412.　　　Specification of Letters Patent.　　　Patented May 7, 1907.

Application filed February 8, 1906. Serial No. 300,097.

*To all whom it may concern:*

Be it known that I, OTTO BEITLER, a citizen of the United States, residing at Pittsburg, in the county of Allegheny and State of Pennsylvania, have invented a certain new and useful Improvement in Vehicle-Hubs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in vehicle hubs; and it comprises the forming of a sectional or built-up hub in such manner that, spokes may be removed or replaced with but little labor, and the invention further consists in certain details of construction and combination of parts, as will be fully described hereinafter.

In the accompanying drawings—Figure 1 is a side elevation of my improved vehicle hub, a part of which is shown in section, the said hub being constructed and arranged in accordance with my invention. Fig. 2 is a side sectional elevation of the same, said section being taken on the line $x$, $x$ of Fig. 1. Fig. 3 is a plan view of the hub having the spokes removed therefrom.

To put my invention into practice and thereby provide a vehicle hub for wagons, &c., that will be simple in construction and durable in its parts, I form from cast metal, the body-portion 2, having an inner annular tapering bore, for the reception of the journal-portion of the axle 1, a dust-guard comprising an annular integral flange 3, at the rear, and an annular integral shell 7 at the front, for the protection of the hooded nut 9, used for securing the hub to the axle 1, in a manner well known in the art. This hub 2 is formed with a large annular flange 4, integral with said hub and with separating portions which forms a series of radially arranged pockets 11, open at the front, and adapted to receive the inner ends 13 of the spokes 12. These pockets 11 are arranged in a circle and at regular intervals about the hub, and are of any desired number. Formed about the reduced forward portion of the hub 2, is a screw-thread 6, which together with a large washer 14 and nut 10, serves as a means for clamping the spokes in position. This washer 14 is annular in form and of the same diameter as the flange 4, and the inner face of the said washer is provided with projecting portions 15, which register and enter the pockets 11 and press against the ends of the spokes therein.

To assemble the parts of the hub, or to remove one or more of the spokes from the wheel should the same become damaged, the nut 10 is removed by means of a suitable wrench. The washer 14 is now removed and the spoke disengaged from the wheel and others placed in position, without cutting the tire and with little labor.

The nut 10 may be fitted with a suitable lock 16, of simple form, and the threads of said nut formed right-hand and left hand, and arranged on either side of the vehicle with respect to the rotatable motion of the wheel.

Various slight modifications and changes may be made in the details of construction without departing from the spirit of the invention. Therefore I do not wish to confine myself to the exact construction, shown and described, but wish to claim all such modified forms as would come properly within the general scope of the invention.

Having thus described my invention, what I claim, and desire to secure by Letters Patent, is:—

A vehicle hub comprising the body-portion having an inner, annular tapering bore for the axle journal, front and rear dust guards formed integral with said body portion, a reduced portion 5 at the front of the hub a part of which is formed with a screw-thread, a series of radially-arranged pockets 11, each of which is open at the front, for the reception of the inner ends of the spokes of the wheel, a threaded nut 10 to engage with the threaded portion of the hub, an intermediate washer 14, said washer being formed with a series of inwardly projecting parts 15, to register with and enter the pockets 11 and bear against the spokes, the screw-thread of said nut being formed with respect to the forward rotatable movement of the wheel on which it is used and a means whereby said nut may be locked to prevent turning, all arranged and combined, substantially as described.

In testimony whereof, I affix my signature, in presence of two witnesses:

OTTO BEITLER.

Witnesses:
C. C. LEE,
ALFRED M. LEE.